United States Patent [19]

Tettamanti

[11] 4,136,987

[45] Jan. 30, 1979

[54] MECHANICAL SPLICE FOR WIRE STRANDS

[75] Inventor: Dante Tettamanti, Pierrefonds, Canada

[73] Assignee: Wire Rope Industries Ltd., Montreal, Canada

[21] Appl. No.: 825,542

[22] Filed: Aug. 16, 1977

[30] Foreign Application Priority Data

Dec. 20, 1976 [CA] Canada .................................. 268246

[51] Int. Cl.² .............................................. F16G 11/02
[52] U.S. Cl. ....................................... 403/212; 403/284
[58] Field of Search ............... 403/212, 284, 285, 391, 403/210

[56] References Cited

U.S. PATENT DOCUMENTS

| 2,307,216 | 1/1943 | Graham | 403/391 |
| 2,464,432 | 3/1949 | Brickman | 403/284 X |
| 3,015,685 | 1/1962 | Gerlach et al. | 403/391 X |
| 3,514,817 | 6/1970 | Sahm | 403/284 X |

FOREIGN PATENT DOCUMENTS

| 728820 | 12/1942 | Fed. Rep. of Germany | 403/212 |
| 1016512 | 9/1957 | Fed. Rep. of Germany | 403/284 |
| 554310 | 6/1943 | United Kingdom | 403/210 |

*Primary Examiner*—Andrew V. Kundrat
*Attorney, Agent, or Firm*—Spencer & Kaye

[57] ABSTRACT

A mechanical splice for forming turn-back loop ends in wire strands is disclosed. This splice comprises an elongated element of extruded aluminum having two longitudinal bores parallel to the axis of the element and separated by a partition of a predetermined thickness. Each bore is of a diameter slightly larger than the diameter of the strand for insertion of the live end of the strand in one of the bores and of the dead end of the strand in the other bore.

6 Claims, 5 Drawing Figures

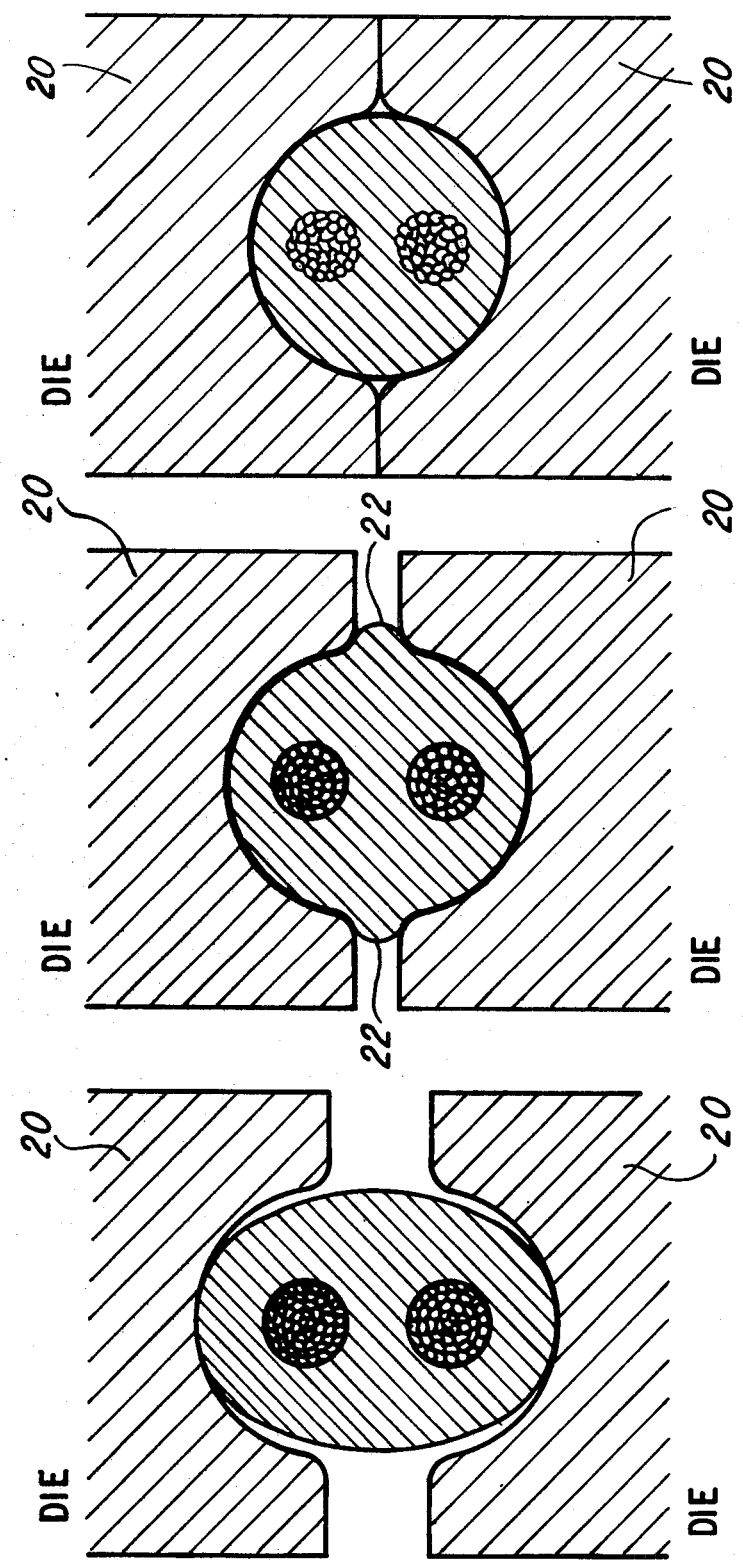

MECHANICAL SPLICE FOR WIRE STRANDS

This invention relates to a mechanical splice for wire strands, more particularly to a splice used for forming turn-back loop ends in wire strands.

As commonly known, a wire strand is formed by stranding together a plurality of steel wires whereas a wire rope is formed by laying a plurality of strands about a common core. Thus, there are deeper interstices between the strands of a wire rope than between the wires of a strand. Consequently, a wire strand is smoother than a wire rope and more liable to slippage of the strand under the mechanical splice.

Wire strands of a wide variety of diameters are made and are generally known as guy strands, tower strands or bridge strands depending on their use. Guy strands normally have a diameter of less then ¼ of an inch and are used for guying structures such as television masts on the roof of a house. Tower strands have a diameter ranging from 174 of an inch to 1 inch and are generally used to guy or support transmission towers. Bridge strands may have a diameter of up to 2 inches or more and are used to support the roadways of suspension bridges and for other uses in heavy construction.

Wire strands are generally used in installations where there is little flexing of the strand. Also, wire strands are subject to less elongation under load than wire ropes. However, it has been generally difficult to achieve adequate tensile strength efficiency with wire strands when a mechanical splice is used for forming turn-back loop end in the strand.

The most commonly known mechanical splices for strands are the wire rope clips and the swaged ferrules. Wire rope clips have the tendency to slip due to the smooth surface of the wire strands and also to accommodation and deformation of the strands during use. Thus, the bolts have to be retightened. Swaged ferrules have inconsistent tensile strength efficiency due to distortion and indentation between wires at the touching area of the two parts of the strand in the ferrule. Under the pressing operation of the ferrule, contacting wires are also cut thus reducing the efficiency of the connection.

In view of the above, it has been most difficult to provide mechanical splices having high and consistent tensile strength efficiency. Such tensile efficiency is defined as the actual breaking load of the strand divided by the catalog breaking strength times 100. It has never been possible to obtain consistent 100% or more tensile strength efficiency with the mechanical splices of the prior art due to slippage and distortion or breakage of some of the wires during installation of the splice. To overcome this drawback, it has been common practice to overdesign the wire strand to make up for the deficiency in the tensile strength that occurs at the mechanical splice.

It is therefore the object of the present invention to provide a mechanical splice which will have a high and consistent tensile strength efficiency. It has been found that the deficiencies of the prior mechanical splices were due, for the large part, to deformation of the live end of the wire strand during installation of the mechanical splice because of the severe compression and often cutting of the wires at the contact area of the live and dead end of the wire strand during clamping or swaging of the mechanical splice.

The mechanical splice, in accordance with the invention, comprises an elongated element of extruded aluminum having two longitudinal bores parallel to the axis of the element and separated by a partition of predetermined thickness. Each bore is of a diameter slightly larger than the diameter of the strand for insertion of the live end of the strand in one of the bores and the dead end of the strand in the other.

The splice is preferably of elliptical cross-section to facilitate clamping or swaging in two halves, round parallel dies. However, circular or other cross-sections are also envisaged.

The thickness of the material between the two bores will vary with the diameter of the strand but the minimum thickness should be about ¼ inch. The above design provides increased surface area of the wire strand which can contact the material of the splice during compression and thus increases the frictional forces and prevents slippage during tension of the wire strand. In addition, the thickness of material between the live end and the dead end of the strand in the mechanical splice act as a cushion to prevent distorsion and damage of the wire strand during swaging.

The diameter of the bore in the mechanical splice is preferably about 1/16 of an inch over the actual diameter of the strand whereas the length of the splice is a minimum of about 9 to 10 times the diameter of the strand.

The minimum thickness of the splice between the internal surface of anyone of the bores and the external surface of the splice is preferably about 50% of the strand diameter.

The invention will now be disclosed, by way of example, with reference to the accompanying drawings in which:

FIGS. 3 to 5 illustrate installation of the splice in accordance with the invention.

Figure 1:
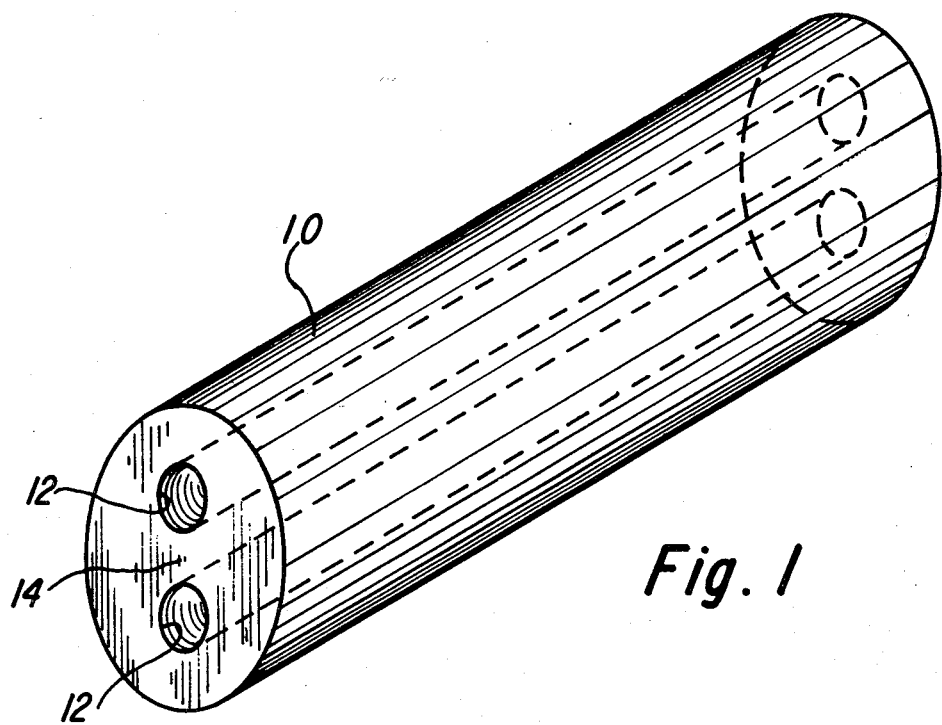
FIG. 1 illustrates a perspective view of a mechanical splice in accordance with the invention.

Referring to FIG. 1, there is shown a mechanical splice consisting of an elongated element 10 of elliptical cross-section and having two longitudinal bores 12 parallel to the central axis of the element and separated by a partition 14 of a predetermined thickness. The splice is made of extruded aluminum and preferably of an extruded aluminum alloy combining maximum ductility with maximum tensile strength, such as alloy 6063T4. The space or partition 14 between the two bores 12 in the mechanical splice will vary with the diameter of the strand to be inserted into bores 12 but the minimum thickness should be ¼ inch so as to provide sufficient material between the two strands during swaging as it will be explained later. The bore material is preferably kept the smallest possible, say 1/16 of an inch over the actual diameter of the strand. The minimum length of the splice is about 9 to 10 times the diameter of the strand.

Figure 2:
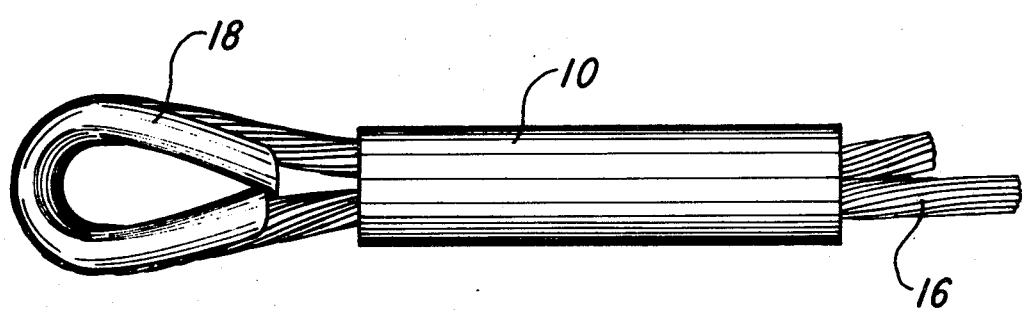
FIG. 2 illustrates the splice of FIG. 1 installed on a wire strand.

FIG. 2 illustrates the mechanical splice assembled onto a wire strand 16. The main or live end of the strand is passed through one bore then turned back around a thimble 18 and passed through the other bore. The splice is then swaged in known manner as it will be explained later on the description.

The splice is preferably initially of elliptical cross-section to facilitate clamping or swaging in two halves, round parallel dies 20 as illustrated in FIG. 3 of the drawings. In a first cycle, the sleeve is half-pressed as shown in FIG. 4 so as to minimize flashings which would normally be formed at 22. In a second cycle, the sleeve is turned around a few degrees and the pressing operation is completed as shown in FIG. 5. It is to be understood that the splice may be of circular or other cross-sectional shape and that dies of different shape may be used for clamping or swaging the splice.

The aluminum under pressure elongates and flows around the wires of the strand during clamping or swaging, thus filling all the interstices between the wires and fully enclosing the strand leaving substantially no hollow spaces. It will also be clearly seen in FIG. 5 that the dead and live ends of the strand are separated by a certain thickness of aluminum which prevents cutting of the wires during compression and, furthermore, permits optimum contact area between the wires of the strand and the splice itself. The cross-sectional area of the aluminum is preferably reduced by about 30% in the pressing or swaging operation.

Samples of various diameters of strand as manufactured by Wire Rope Industries Ltd. were tested. Each sample had a loop formed at at least one end of the wire strands and the live and dead ends of the strand were secured together by means of a splice in accordance with the invention. The actual breaking load of each sample was determined and the percent tensile strength efficiency for each sample was calculated. Four tests were made for each of the samples and the lowest results of these tests were as follows:

TABLE I

| STRAND SIZE | NOMINAL BREAKING STRENGTH | ACTUAL BREAKING LOAD OF SAMPLE | EFF% |
| --- | --- | --- | --- |
| 1-1/4" | 192,000 | 213,500 | 111% |
| 1-3/16" | 172,000 | 188,900 | 109% |
| 1-1/8" | 156,000 | 166,450 | 107% |
| 1-1/16" | 138,000 | 149,250 | 108% |
| 1" | 122,000 | 133,290 | 109% |
| 15/16" | 108,000 | 118,580 | 109% |
| 7/8" | 92,000 | 100,000 | 109% |
| 13/16" | 80,000 | 89,150 | 111% |
| 3/4" | 68,000 | 74,500 | 109% |
| 11/16" | 58,000 | 61,250 | 106% |
| 5/8" | 48,000 | 52,760 | 110% |
| 9/16" | 38,000 | 40,170 | 106% |
| 1/2" | 25,550 | 27,650 | 108% |

In each sample of Table I the tensile efficiency of the strand was greater than 100% and the efficiency was fairly consistent for all the samples.

Further samples of strands of corresponding diameters manufactured by Wire Rope Industries Ltd. were prepared and a loop was formed at each end of the samples but connected with aluminum ferrules of the type having only one bore as commonly known in the art. The percent tensile efficiency of such strands was as follows:

TABLE II

| Strand Size | Efficiency | Strand Size | Efficiency |
| --- | --- | --- | --- |
| 1/2 | 107.5% | 15/16 | 103.8% |
| 9/16 | 116% | 1 | 98% |
| 5/8 | 115% | 1-1/16 | 102.5 |
| 11/16 | 116.5 | 1-1/8 | 101.1% |
| 3/4 | 113.8 | 1-3/16 | 98% |
| 13/16 | 102.5% | 1-1/4 | 96.3% |
| 7/8 | 102.5% | 1-5/16 | 96.4% |

It will be seen from Table II that the efficiency of such samples was not consistent at all and that for some of them was below 100%. It will be noted that efficiencies lower than 100% are not acceptable since it means that the strand with the loop end formed therein does not meet the catalog requirement of the strand because of the weakness in the splice.

Although the invention has been disclosed with reference to a particular embodiment illustrated in the drawings, it is to be unerstood that the invention is not to be limited to this particular embodiment but that various alternatives are envisaged wtihin the scope of the following claims.

1. A mechanical splice for forming turn-back loop ends in wire strands having a breaking strength which is over 100% of the nominal breaking strength of the wire strands, comprising an elongated element of extruded aluminum having two longitudinal smooth bores parallel to the axis of the element and separated by a partition having a minimum thickness of ¼ inch, each bore being of a diameter slightly larger than the diameter of the strand for insertion of the main body of the strand in one of the bores and of the turn-back end of the strand in the other and the length of the elongated element also being at least a minimum predetermined multiple of the diameter of the strand.

2. A mechanical splice as defined in claim 1, wherein the bore diameter is about 1/16 of an inch over the actual diameter of the strand.

3. A mechanical splice as defined in claim 1, wherein the length of the splice is a minimum of 9 to 10 times the diameter of the strand.

4. A mechanical splice as defined in claim 1, wherein the minimum thickness of the splice between the internal surface of anyone of the bores and the external surface of the splice is about 50% of the strand diameter.

5. A mechanical splice as defined in claim 1, wherein the splice is made of an aluminum alloy.

6. A mechanical splice as defined in claim 1, wherein the elongated element is initially of elliptical cross-section and is pressed to form a final splice of circular cross-section around the main body and the turn-back end of such strand.

* * * * *